United States Patent Office 2,786,851
Patented Mar. 26, 1957

2,786,851
REACTION PRODUCT OF 3,4-DIHALO-SULFOLANE WITH AMMONIA AND PROCESS

John E. Mahan, Bartlesville, Okla., assignor to Phillips Petroleum Company, a corporation of Delaware No Drawing. Application October 25, 1951,
Serial No. 253,200

7 Claims. (Cl. 260—330.5)

This invention relates to a novel and particularly useful class of compounds comprising polycyclic sulphones. In one of its more specific aspects this invention relates to a group of polycyclic sulphones produced by reacting ammonia with a 3,4-dihalosulfolane.

The materials of this invention are produced by reacting a 3,4-dihalosulfolane and ammonia. The reaction can be carried out under conditions falling within the following limits, temperature, —50° to 300° F.; pressure, atmospheric to 2,000 pounds per square inch gage; reaction time, 2 minutes to 24 hours, usually 10 to 60 minutes and from 3 to 50 mols of ammonia per mol of dihalosulfolane. The reaction between the dihalosulfolane and ammonia can be carried out in the presence of an inert diluent such as chloroform, ether and the like. If it should be desired to employ a larger quantity of diluent in the reaction mixture, even higher mol ratios of ammonia to dihalosulfolane can be employed. When no diluent is employed it is preferred to employ at least about 10 mols of ammonia per mol of dihalosulfolane. When diluents, or inert solvents are employed they preferably are such as to dissolve the reactants or they can dissolve only the dihalosulfolanes. It may be desirable under certain conditions to employ a diluent which will dissolve the reactants but one in which the products are substantially insoluble. The reaction may be carried out in suitable glass or glass-lined equipment or in metallic equipment which is not attacked by ammonia, ammonium chloride or sulfur dioxide. In some instances it may be desirable to add to the reaction mixture a minor amount, usually below about 1 to 5 percent by weight of the total reaction mixture, of a polymerization inhibitor such as pyrogallol or the like.

The dihalosulfolane which is preferred in the practice of our invention is a 3,4-dihalosulfolane and may be represented by the structural formula:

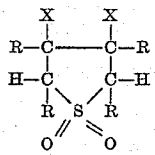

wherein X is a halogen preferably bromine or chlorine and wherein R is selected from the group consisting of a hydrogen atom and a hydrocarbyl radical. Suitable hydrocarbyl radicals include the aryl, alkyl, alkaryl, aralkyl and cycloalkyl radicals, wherein the total number of carbon atoms present in any hydrocarbyl radical is not greater than 12. It is preferred that the total number of carbon atoms present in the formula is not greater than 16. Illustrative of the hydrocarbyl radicals which may be employed are the various alkyl radicals such as methyl, ethyl, propyl, isopropyl, n-butyl, tert-butyl, hexyl, octyl and the like; the various aryl, alkaryl and aralkyl radicals such as phenyl, benzyl, xylyl, tolyl, and the like, the cycloalkyl radicals which may be employed include cyclopropyl, cyclopentyl, cyclobutyl, cyclohexyl and the like. It is to be understood of course that the higher and lower molecular weight homologs of these hydrocarbyl radicals may also be employed. It is preferred in the practice of our invention to employ 3,4-dichlorosulfolane which is represented by the structural formula

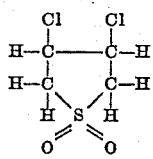

The products contained in the reaction mixture in a practice of this invention include the following: a 3a,7a-dihydrothionaphthene sulfone such as may be represented by the structural formula

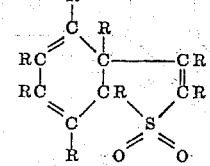

wherein R is selected from the group consisting of a hydrogen atom and a hydrocarbyl radical selected from the group consisting of aryl, alkyl, alkaryl, aralkyl, and cycloalkyl radicals wherein the total number of carbon atoms present in any hydrocarbyl radical is not greater than 12. When 3,4-dichlorosulfolane is employed the following compound having the empirical formula $C_8H_8O_2S$ and having the structural formula

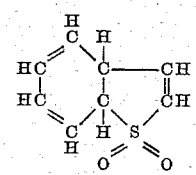

namely 3a,7a-dihydrothionaphthene sulfone is obtained. Another compound isomeric to 3a,7a-dihydrothionaphthene sulfone is also prepared, namely 2,3-dihydrothionaphthene sulfone which is represented by the structural formula

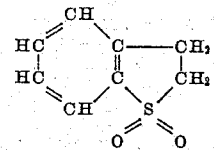

This particular compound is known and has been prepared by other workers in the chemical field, but has required heretofore a complicated procedure of preparation involving a number of steps. In accordance with my invention, however, this compound can now be prepared by directly reacting ammonia with a 3,4-dihalosulfolane such as 3,4-dichlorosulfolane. Other materials which may be prepared in accordance with my invention are compounds which may be represented by the following structural formulas:

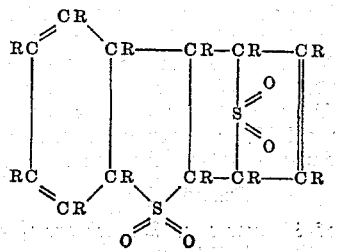

or

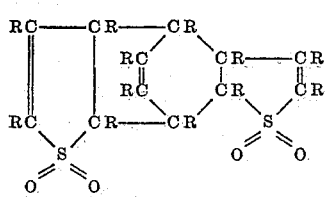

wherein R is hydrogen or a hydrocarbyl radical as hereinbefore described. If 3,4-dichlorosulfolane is employed as the starting material, a compound having the empirical formula $C_{12}H_{12}O_4S_2$ and which may be represented by one of the following structural formulas:

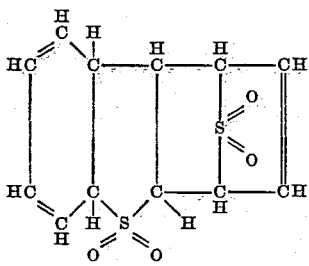

or

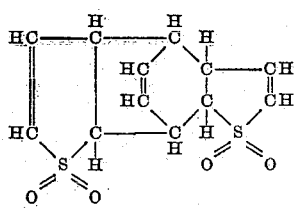

is recovered from the reaction mixture.

Another material which is produced and recovered from the reaction mixture in accordance with my invention is a solid material which is soluble in acetonitrile and which contains from about 5.8 to 8.25 percent by weight nitrogen (nitrogen being determined by a procedure involving titration with 0.1 N HCl). This material is substantially free of halogen.

The compounds illustrated and described above are useful as chemical intermediates in the pharmaceutical and related fields and since they contain olefinic unsaturation they will undergo a variety of reactions such as halogenation and thus serve as the starting point for a wide variety of more complex organic compounds. These materials are also useful as pour point depressants, antioxidants, wax modifiers and a number of other uses. More particularly 3a,7a-dihydrothionaphthene sulfone having the empirical formula $C_8H_8O_2S$ has also shown fungicidal activity toward *G. cingulata* and *A. oleracea*.

The following examples serve to illustrate the invention.

*Example I*

A mixture of 15 grams of 3,4-dichlorosulfolane, 60 grams of ammonia and 0.063 gram of pyrogallol was reacted at the boiling point of liquid ammonia (about $-27.4°$ F.) at one atmosphere pressure for approximately 30 minutes. After removal of unreacted ammonia, 19 grams of reaction product remained. The reaction product was extracted with ether. The ether was evaporated from the solution and the crystalline material amounting to 1.8 grams was recrystallized from ethyl alcohol. The melting point of this purified material was 100–102° C. Qualitative tests for nitrogen and chlorine were negative and for sulfur were positive. The ether-soluble material was also soluble in water, benzene, and alcohol and decolorized neutral potassium permanganate solution.

*Example II*

A mixture of 30 grams of 3,4-dichlorosulfolane, 90 grams of ammonia and 0.25 gram of pyrogallol was reacted at the boiling point of liquid ammonia ($-27.4°$ F.) at one atmosphere pressure for approximately 15 minutes. The reaction product, after removal of unreacted ammonia, weighed 35.5 grams. The total reaction product was extracted with two 300 ml. portions of ether. The total ether-soluble material weighed 6.1 grams. A white crystalline material was recovered from the ether solution and after several recrystallizations from absolute ethyl alcohol the compound melted at 102° C. The material was also soluble in water, benzene, and ethyl alcohol. This material is believed to be 3a,7a-dihydrothionaphthene sulfone. The theoretical and experimental compositions are listed below, assuming an empirical formula of $C_8H_8O_2S$.

|  | Experimental | Theoretical |
|---|---|---|
| Percent C | 57.02 | 57.12 |
| Percent H | 4.78 | 4.79 |
| Percent S | 18.95 | 19.06 |
| Percent O | [1] 19.25 | 19.03 |
| Molecular weight | [2] 165 | 168.92 |

[1] By difference.
[2] Freezing point-depression of benzene method.

The material remaining after ether extraction of the total reaction product was extracted with two 300 ml. portions of acetone. From this acetone extract 7.1 grams of a crystalline substance were isolated. This crystalline material was extracted with two small portions of water which dissolved all but two grams of the material. The two grams of water-insoluble material was boiled with water and filtered while hot. The filtrate was cooled and allowed to stand overnight. From this filtrate 0.4 gram of white crystalline material precipitated. This material had a melting point 338° C. with some decomposition taking place. It was partially or slightly soluble in acetone, benzene, carbon tetrachloride, chloroform, dioxane, pyridine and thiophene. It was completely soluble in sulfolane. The following experimental and theoretical compositions were obtained assuming an empirical formula of $C_{12}H_{12}O_4S_2$.

|  | Experimental | Theoretical |
|---|---|---|
| Percent C | 50.64 | 50.69 |
| Percent H | 4.39 | 4.25 |
| Percent S | 22.30 | 22.55 |
| Percent O | [1] 22.67 | 22.51 |

[1] By difference.

The ether-insoluble and acetone-insoluble material remaining after the above extractions amounted to 8.0 grams. A chlorine determination on this residue indicated that it contained 84.5 weight percent ammonium chloride.

*Example III*

A mixture of 50 grams of 3,4-dichlorosulfolane and 450 grams of ammonia was heated in a pressure vessel for 8 hours at 212° F. The pressure in the vessel rose to a maximum of 850 pounds per square inch gage. After removal of unreacted ammonia, the total reaction product weighed 69 grams. The total product was extracted with acetonitrile and it was found that 13.2 grams were soluble in this solvent. The acetonitrile-soluble material was found to contain 8.25 percent nitrogen (determined by a method involving titration with HCl). Analysis for chlorine showed 0.1 to 0.2 weight percent, indicating that the material contained substantially no chlorine.

A similar reaction employing 15.4 grams of 3,4-dichlorosulfolane and 180 grams of ammonia was carried out at the boiling point of liquid ammonia ($-27.4°$ F.), at one atmosphere, for a period of 72 hours. Acetonitrile used as a solvent extracted 7.4 grams of the total product which was found to contain 7.2 percent nitrogen determined as indicated above.

As will be evident to those skilled in the art in light of this disclosure many modifications, substitutions, and changes may be made without departing from the spirit or scope of this invention.

I claim:
1. The method for the production of 3a,7a-dihydrothionaphthene sulfone which comprises reacting ammonia with a 3,4-dihalosulfolane represented by the structural formula

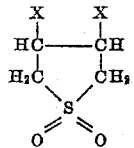

wherein X is selected from the group consisting of chlorine and bromine, at a temperature in the range of −50° to +300° F., a pressure of from atmospheric to 2000 p. s. i. g., and for a period of time sufficient to produce said 3a,7a-dihydrothionaphthene sulfone.

2. The method of claim 1 wherein the reaction is conducted in the presence of an inert organic diluent.
3. The method of claim 1 wherein the reaction is conducted for a period of time of at least 2 minutes.
4. The method of claim 3 wherein from about 3 moles to 50 moles of ammonia per mole of 3,4-dihalosulfolane are employed in said reaction.
5. The method of claim 4 wherein said 3,4-dihalosulfolane is 3,4-dichlorosulfolane.
6. The method of claim 4 wherein said 3,4-dihalosulfolane is 3,4-dibromosulfolane.
7. A new composition of matter prepared by reacting ammonia with a 3,4-dihalosulfolane represented by the structural formula

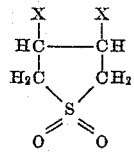

wherein X is selected from the group consisting of chlorine and bromine, at a temperature in the range of −50° to +300° F., a pressure of from atmospheric to 2000 p. s. i. g., and for a period of at least two minutes.

References Cited in the file of this patent
UNITED STATES PATENTS

| | | |
|---|---|---|
| 2,557,673 | McKellin et al. | June 19, 1951 |
| 2,610,192 | Mahan et al. | Sept. 9, 1952 |
| 2,682,545 | Mahan et al. | June 29, 1954 |

OTHER REFERENCES

Fricke: Berichte 58B: 1590 (2,3-dihydrothionaphthene sulfone).